United States Patent [19] [11] 4,076,668
Kaneda et al. [45] Feb. 28, 1978

[54] RUBBER COMPOSITION

[75] Inventors: Kunihiro Kaneda; Masashi Kida; Akihiko Nakayama, all of Hiratsuka; Atsushi Kanazawa, Ise; Hiroyuki Kaido, Hiratsuka; Yasuhiro Mizumoto, Hiratsuka; Tsuneo Koyama, Hiratsuka, all of Japan

[73] Assignee: The Yokohama Rubber Co., Ltd., Tokyo, Japan

[21] Appl. No.: 661,858

[22] Filed: Feb. 27, 1976

[30] Foreign Application Priority Data

Oct. 4, 1975 Japan .................................... 50-119373

[51] Int. Cl.$^2$ .............................................. C08K 5/09
[52] U.S. Cl. .......................... 260/23.7 M; 156/110 A; 260/19 UA; 526/4; 526/5
[58] Field of Search ............... 526/4, 5, 914; 260/709, 260/23.7 M, 23.7 H, 23.7 B, 23.7 R, 19 UA, 45.85 B; 156/110 A

[56] References Cited

U.S. PATENT DOCUMENTS

| 3,514,370 | 5/1970 | Canevari | 526/4 |
| 3,878,150 | 4/1975 | Lohr | 260/23.7 M |
| 3,925,279 | 12/1975 | Horii | 260/23.7 R |
| 3,963,652 | 6/1976 | Tanimura | 260/19 UA |

Primary Examiner—Paul R. Michl
Attorney, Agent, or Firm—Oblon, Fisher, Spivak, McClelland & Maier

[57] ABSTRACT

A rubber composition which comprises more than 0.5 wt parts of a cobalt salt of organic acid, more than 0.5 wt part of monohydroxybenzoic acid component and 100 wt parts of a rubber.

10 Claims, No Drawings

RUBBER COMPOSITION

BACKGROUND OF THE INVENTION

The present invention is related to a rubber composition which imparts excellent adhesive property between a rubber composition and a reinforcing material when preparing a composite product of the rubber and the reinforcing material.

Heretofore, in forming a bond between a rubber and a metallic material such as steel cord or between a rubber and a fibrous material such as nylon cord, it has been known to plate the metal material with zinc or a copper alloy such as brass and bronze in the former case and to treat the fibrous material such as nylon cord with a resorcinol-formaldehyde latex in the latter case.

In order to improve the adhesive property, it has been known to add certain additive such as a cobalt salt of organic acid such as cobalt naphthenate, cobalt stearate, and cobalt octylate in the rubber.

However, the adhesive system has the disadvantages that the adhesive property is suddenly decreased by excess time or temperature of a heat treatment in a vulcanization and a moisture resistance of adhesion is low. In order to improve the adhesion, it has been proposed to add an alkyl-phenol resin to compensate for the decrease of adhesive property caused by the vulcanization.

In said case, it is hard to expect an improvement of moisture resistance and the vulcanization is disadvantageously slow.

SUMMARY OF THE INVENTION

It is an object of the present invention to provide an improved rubber composition which has high adhesive properties with reinforcing material wherein the adhesive bond has high moisture resistance while simultaneously possessing satisfactory vulcanization characteristics.

This and other objects of the invention can be attained by providing a rubber composition which comprises more than 0.5 wt. parts of a cobalt salt of an organic acid, more than 0.5 wt. parts of a monohydroxybenzoic acid component and 100 wt. parts of a rubber.

DETAILED DESCRIPTION OF THE PREFERRED EMBODIMENTS

The choice of the rubber to be used in the present invention is not critical and any rubber may be used. Typical rubbers which may be used in the invention include natural rubber and synthetic rubbers such as styrene-butadiene rubber, poly-butadiene rubber, polyisoprene rubber, chloroprene rubber, nitrile rubber, and the like. Natural rubber is primarily used for tires.

Typically, the organic acid component of the cobalt salts of an organic acid has from about 6 to about 30 carbon atoms. Exemplary cobalt salts are: cobalt naphthenate; cobalt stearate, cobalt octylate, cobalt octate, cobalt oleate, cobalt resinate, cobalt linoleate, cobalt tallate, and the like.

The source of the monohydroxybenzoic acid component is not critical. It is possible to use monohydroxybenzoic acid or derivatives thereof which form monohydroxybenzoic acid or a salt thereof in the rubber composition. A typical derivative includes the alkyl monohydroxybenzoates. It is preferable to use paramonohydroxybenoic acid. When using orthomonohydroxybenzoic acid a larger amount must be used to attain the desired results.

It is preferable to combine 0.5 – 10 wt. parts, preferably 1 – 6 wt. parts of the cobalt salt of an organic acid and 0.5 – 10 wt. parts, preferably 1 – 6 wt. parts of monohydroxybenzoic acid with each 100 wt. parts of the rubber. When the content of the cobalt salt of an organic acid and the content of the monohydroxybenzoic acid are less than the lower limit, the objects of the present invention are not attained. Whereas, when the amount present is greater than the upper limit, the physical properties of the rubber composition are adversely affected, however, the advantages and objects of the present invention are not affected by such an excess. The combination of adding the cobalt salt of an organic acid and monohydroxybenzoic acid to a rubber, provides a rubber composition which has excellent adhesion to metallic material both before and after vulcanization. Further, the cure rate (vulcanization speed) of the unvulcanized rubber composition is not effected and the adhesive property is maintained even after excessive vulcanization.

It is possible to improve the adhesive property of the present composition with fibrious materials and the moisture resistance of the adhesive bond before and after vulcanization by further combining more than 0.5 wt. parts, preferably 0.5 – 10 wt. parts, of at least one of an alkylphenol-type resin or cresol-formaldehyde type resin per 100 parts of the rubber, with the above-mentioned rubber composition (composition I). The resulting rubber composition will be referred to as rubber composition (II). When the content of the alkylphenol-type resin or cresol-formaldehyde-type resin is less than the lower limit, the desired effect is not attained. If the content of said resin is more than the upper limit, the physical properties of the rubber composition (II) are adversely affected though the improved adhesion and moisture resistance afforded by the present invention are retained.

Typical alkylphenol-type resins include: t-butyl-phenolformaldehyde resin, p-octylphenol-formaldehyde resin, and modified phenol resins such as cashew oil modified phenol resin, dicyclopentadiene modified phenol resin and the like.

Typical cresol-formaldehyde type resins include: o-cresolformaldehyde resin, p-cresol-formaldehyde resin and the like.

The rubber composition of the present invention can be prepared by blending said components into the rubber by conventional blending methods. It is usual to add a suitable vulcanizing agent, a filler, a reinforcing material or other additives together with the additives of this invention or separately before vulcanization. The blending methods used and order of as described in the prior art. Addition of the various components is not critical and techniques known in the prior art may be used to prepare the composition of the present invention.

The conditions used to prepare the present compositions, may be according to those of the prior art. In particular, those conditions are found in the Encyclopedia of Polymer Science and Technology Vol. 12 Pages 161–353 on rubbers; ibid Vol. 14 Pages 42 – 64 on tires and tire cord; ibid Vol. 8 Pages 184 – 185 on tire cord dip; ibid Vol. 14 Pages 740 – 756 on Vulcanization; and Rubber Chemistry and Technology 46 (4) Pages 981 – 998 on rubber-to-textile and rubber-to-steel cord adhesion.

The invention will be further illustrated in detail by certain examples.

The vulcanization of the rubber composition was carried out at 145° C for 45 minutes.

Table 1

Unit: weight part

|  | Exp. 1 | 2 | 3 | 4 | 5 | 6 | 7 | Stand. Exp. 1 | Comp. Exp. 1 |
|---|---|---|---|---|---|---|---|---|---|
| Master Batch | | | | | | | | | |
| Natural rubber | 100 | 100 | 100 | 100 | 100 | 100 | 100 | 100 | 100 |
| Zinc oxide (#3) | 5 | 5 | 5 | 5 | 5 | 5 | 5 | 5 | 5 |
| Stearic acid | 3 | 3 | 3 | 3 | 3 | 3 | 3 | 3 | 3 |
| Carbon black (HAF) | 40 | 40 | 40 | 40 | 40 | 40 | 40 | 40 | 40 |
| Process Oil *1 | 5 | 5 | 5 | 5 | 5 | 5 | 5 | 5 | 5 |
| Cobalt naphthenate | 5 | 5 | 5 | — | — | — | — | 5 | 5 |
| Cobalt stearate | — | — | — | 3 | 3 | 3 | 0.5 | — | — |
| p-hydroxybenzoic acid | 0.5 | 3 | 6 | 3 | — | 1 | 3 | — | — |
| o-hydroxybenzoic acid | — | — | — | — | 3 | — | — | — | — |
| alkylphenol resin *2 | — | — | — | — | — | — | — | — | 3 |
| Vulcanizing agent | | | | | | | | | |
| Sulfur | 4.5 | 4.5 | 4.5 | 4.5 | 4.5 | 4.5 | 4.5 | 4.5 | 4.5 |
| N-oxydiethylene-2-benzothiazol-sulfenamide | 0.5 | 0.5 | 0.5 | 0.5 | 0.5 | 0.5 | 0.5 | 0.5 | 0.5 |

Note:
*1 Process Oil: aromatic type process oil
*2 Alkylphenol resin: Hitanol 2501 (Hitachi Kasei K.K.)

EXAMPLES 1–7; STANDARD EXAMPLE 1; AND COMPARATIVE EXAMPLE 1:

The compositions stated in Table 1 were blended as follows.

The test results of the rubber compositions of Examples 1 – 7; Standard Example 1; and Comparative Example 1 were stated in Table 2.

PREPARATION AND VULCANIZATION OF RUBBER COMPOSITION

The components of each master batch was blended by a Bumbury's mixer and a vulcanizing agent was blended to the master batch by a roller mill to prepare each rubber composition.

EXAMPLES 8 – 14: STANDARD EXAMPLE 2: COMPARATIVE EXAMPLE 2:

The compositions stated in Table 3 were blended as follows;

The test results of the rubber compositions of Examples 8–14: Standard Example 2 and Comparative Example 2 were stated in Table 4.

PREPARATION AND VULCANIZATION OF RUBBER COMPOSITION

The components of each master batch was blended by a Bumbury's mixer and a vulcanizing agent was blended to the master batch by a roller mill to prepare each rubber composition.

The vulcanizaton of the rubber composition was carried out at 145° C for 45 minutes.

Table 2

|  | Exp. 1 | 2 | 3 | 4 | 5 | 6 | 7 | Stand. Exp. 1 | Comp. Exp. 1 |
|---|---|---|---|---|---|---|---|---|---|
| Physical properties | | | | | | | | | |
| Tensile strength (Kg/cm$^2$) | 249 | 244 | 242 | 235 | 222 | 248 | 240 | 234 | 253 |
| Elongation (%) | 430 | 410 | 475 | 360 | 310 | 370 | 485 | 345 | 480 |
| 300% Modulus, (Kg/cm$^2$) | 161 | 157 | 142 | 174 | 173 | 171 | 175 | 170 | 137 |
| Hardness (Japanese Industrial Standard A) | 77 | 78 | 76 | 79 | 78 | 79 | 78 | 74 | 68 |
| Rheometer T95 at 160° C | 15.9' | 16.3' | 16.8' | 13.6' | 14.0' | 13.7' | 16.5' | 16.2' | 22.8' |
| **Adhesive strength (Kg/inch embedded) *3** | | | | | | | | | |
| Brass plated steel cord (1 inch embedded) | | | | | | | | | |
| Vulcanization condition: | | | | | | | | | |
| 145° C : 45 min. (rubber coverage %) | 72(100) | 78(100) | 73(100) | 82(100) | 67(90) | 70(95) | 70(90) | 64(75) | 63(85) |
| 160° C : 20 min. (rubber coverage %) | 61(90) | 67(94) | 60(100) | 79(95) | 59(90) | 63(95) | 59(90) | 53(63) | 58(69) |
| 160° C : 60 min. (rubber coverage %) | 51(85) | 53(93) | 50(100) | 55(100) | 51(90) | 52(95) | 50(80) | 43(33) | 49(45) |

Note:
*3 (rubber coverage %):
the data in ( ) are rubber coverage: 100%: completely covered with rubber 0%: covered with no rubber.

Table 3

Unit: weight part

|  | Exp. 8 | 9 | 10 | 11 | 12 | 13 | 14 | Comp. Exp. 2 | Stand. Exp. 2 |
|---|---|---|---|---|---|---|---|---|---|
| Master Batch | | | | | | | | | |
| Natural rubber (RSS #1) | 100 | 100 | 100 | 100 | 100 | 100 | 100 | 100 | 100 |
| Zinc oxide (#3) | 5 | 5 | 5 | 5 | 5 | 5 | 5 | 5 | 5 |
| Stearic acid | 3 | 3 | 3 | 3 | 3 | 3 | 3 | 3 | 3 |
| Carbon black (HAF) | 40 | 40 | 40 | 40 | 40 | 40 | 40 | 40 | 40 |
| Process Oil *1 | 5 | 5 | 5 | 5 | 5 | 5 | 5 | 5 | 5 |
| Cobalt naphthenate | 1 | 5 | 5 | — | — | — | — | 5 | 5 |
| Cobalt stearate | — | — | — | 5 | 3 | 3 | 0.5 | — | — |
| p-hydroxybenzoic acid | — | 3 | 2 | 0.5 | 3 | 6 | 2 | — | — |
| o-hydroxybenzoic acid | 3 | — | — | — | — | — | — | — | — |
| Alkylphenol resin *2 | — | — | — | — | 1 | 5 | — | 3 | — |
| Cresol-formaldehyde resin *3 | 2 | 4 | 6 | 0.5 | — | — | 2 | — | — |

Table 3-continued

| | Exp. 8 | 9 | 10 | 11 | 12 | 13 | 14 | Comp. Exp. 2 | Stand. Exp.2 |
|---|---|---|---|---|---|---|---|---|---|
| Vulcanizing agent | | | | | | | | | |
| Sulfur | 4.5 | 4.5 | 4.5 | 4.5 | 4.5 | 4.5 | 4.5 | 4.5 | 4.5 |
| N-oxydiethylene-2-benzothiazol-sulfenamide | 0.7 | 0.7 | 0.7 | 0.7 | 0.7 | 0.7 | 0.7 | 0.7 | 0.7 |

Note:
*1 Process Oil: aromatic type process oil
*2 Alkylphenol resin: Hitanol 2501 manufactured by Hitachi Kasei K.K.
*3 Cresol-formaldehyde resin: Sumicanol 610 manufactured by Sumitomo Kagaku K.K.

Table 4

| | Exp. 8 | 9 | 10 | 11 | 12 | 13 | 14 | Comp. Exp. 2 | Stand. Exp. 2 |
|---|---|---|---|---|---|---|---|---|---|
| Physical Properties | | | | | | | | | |
| Tensile strength (Kg/cm²) | 230 | 250 | 248 | 240 | 222 | 236 | 237 | 256 | 239 |
| Elongation (%) | 415 | 430 | 470 | 450 | 310 | 460 | 440 | 480 | 340 |
| 300% Modulus, (Kg/cm²) | 165 | 162 | 154 | 163 | 170 | 151 | 166 | 142 | 174 |
| Hardness(Japanese Industrial Standard A) | 76 | 75 | 71 | 74 | 78 | 69 | 77 | 70 | 78 |
| Scorch time ($t_5$) | 22.9' | 21.6' | 23' | 24.5' | 23.7' | 25.5' | 21.1' | 22' | 23.5' |
| Adhesive strength (H test Kg/cm) | | | | | | | | | |
| RFL treated nylon 6 code *4 | 15.5 | 18 | 17.5 | 16.5 | 18.5 | 18.0 | 16.3 | 16 | 15 |
| RFL treated Kevlar cord *5 | 11.5 | 15 | 14 | 13.0 | 14.5 | 15.0 | 11.2 | 11 | 8 |
| Adhesive strength (Kg/1 inch embedded) brass plated steel-cord | | | | | | | | | |
| Vulcanization condition | | | | | | | | | |
| 145° C : 45 min. | 69 | 74 | 75 | 72 | 78 | 70 | 69 | 67 | 64 |
| 160° C : 60 min. | 60 | 66 | 65 | 61 | 67 | 62 | 59 | 58 | 43 |
| Unvulcanized composition after 10 days under high moisture *6 | 64 | 75 | 73 | 69 | 71 | 74 | 61 | 59 | 46 |
| Vulcanized composition after 10 days under high moisture *7 | 74 | 78 | 77 | 71 | 81 | 79 | 67 | 53 | 32 |
| Zinc plated steel cord (Kg/inch embedded) | | | | | | | | | |
| Vulcanization condition | | | | | | | | | |
| 145° C : 45 min. | 74 | 82 | 78 | 75 | 80 | 79 | 75 | 75 | 54 |
| 160° C : 60 min. | 60 | 67 | 64 | 60 | 65 | 60 | 58 | 59 | 38 |

*4: RFL treatment: resorcino-formaldehyde latex treatment
*5: Kevlar(Aramid fiber) cord: manufactured by duPont Co.
*6: The test piece being similar to that of adhesion test was prepared in unvulcanized condition by pressing in a mold as follows. Rubber composition was filled in a mold of ASTM D 2229 wherein brass-plated steel cords were set in parallel with each gap of 12.5 cm and were embedded for 1 inch. The rubber composition was molded by a press at the room temperature. The test piece was kept in 100% of relative humidity for 10 days and then it was vulcanized at 145° C for 45 min.. The pull-out test was carried out.
*7: The rubber composition was filled in a mold of ASTM D 2229 wherein brass-plated steel cords were set in parallel with each gap of 12.5 cm and were embedded for 1 inch. The rubber composition was molded by a press at the room temperature. It was vulcanized at 145° C for 45 min. and then the test piece was kept in 100% of relative humidity for 10 days. The pull-out test was carried out.
The tests of adhesive strength Moony scorch time ($t_s$) Rheometer vulcanization degree T95 were carried out as follows.

ADHESIVE STRENGTH TEST

1. ADHESIVE STRENGTH TO METAL MATERIAL

Steel cords plated with brass or zinc were arranged in parallel with each gap of 12.5 mm.

Each rubber composition was coated from both side of the steel cords to form each fabricated product in which each cord was embedded for 1 inch and the fabricated product was vulcanized under condition of 145° C — 45 mm.; 160° C — 20 min.; or 160° C — 60 min.

The pull-out test was carried out in accordance with ASTM D 2229.

2. Adhesive strength to fibrous material

The adhesive strength to nylon cord or Kevlar (or Aramid fiber) cord was measured in accordance with H test of ASTM D 2138. (under a vulcanization at 148° C for 30 min.)

Mooney scorch time : ($t_s$)

In accordance with Japanese Industrial Standard K 6301, it was measured at 125° C.

Rheometer vulcanization degree T95:

In order to measure suitable vulcanizing time by a Rheometer manufactured by Monsanto Co., Ltd., the time for reaching to 95% torque of the maximum torque was shown as T95.

As it is clear from the results shown in Table 2, the rubber compositions (I) of the invention has cure rates (vulcanization speeds) being faster than that of the Standard Example, and had superior adhesive strength under appropriate vulcanization at 145° C for 45 min., to those of Standard Example 1 and Comparative Example 1 and had remarkably superior adhesive strength under excess vulcanization at 160° C for 60 min. to those of Standard Example 1 and Comparative Example 1.

The fact was clearly found from the result of rubber adhesion on the surface of steel cord pulled out (rubber coverage).

The other characteristics of the rubber compositions of the invention are superior to those of the Standard Examples and the Comparative Examples. Moreover, in the processability, the rubber compositions of the invention are easily mixed without excess stickness on the surface of a mill roll comparing with those of the Comparative Examples. From the results of Table 4, it is clear that the rubber compositions (II) which contain the alkylphenol type resin or the cresol-formaldehyde type resin have remarkably superior adhesive property comparing with those of Standard Example 2 and Comparative Example 2 though the physical properties of the vulcanized products are similar to them. That is, the rubber compositions (II) of the invention have excellent adhesive property to nylon cord and Kevlar cord which are treated with resorcinol-formaldehyde latex and steel cord plated with zinc. Especially, the rubber compositions (II) of the invention have excellent moisture resistance in adhesion to the brass plated steel cord even though the unvulcanized or vulcanized rubber samples are exposed under high humidity comparing with those of the Standard Example and the Comparative Example.

These characteristics are remarkably important in the case of preparation of rubber-wire composites under high humidity, and can be attained by the rubber composition of the invention.

As stated above, the rubber compositions (I) of the invention have excellent adhesive property in the adhesion to a wire material in both cases of appropriate vulcanization and excess vulcanization without delaying the vulcanization, and they can be used as novel adhesive rubber composition.

The rubber compositions (II) of the invention have excellent adhesive property in the adhesion to the nylon cord, Kevlar cord and the zinc plated or brass plated steel cord with high heat resistance in excess vulcanization and without a delay of vulcanization.

With regard to the adhesion to the brass plated steel cord, the rubber compositions (II) have excellent moisture resistance so that they can be used, for composities of rubber-fibrous material or metallic material such as in the belt and carcass of tires and in the cores of belt conveyors as novel adhesive rubber compositions.

We claim:

1. A rubber composition which comprises more than 0.5 wt. parts of a cobalt salt of organic acid, more than 0.5 wt. part of monohydroxybenzoic acid component and 100 wt. parts of a rubber.

2. A rubber composition which comprises more than 0.5 wt. parts of a cobalt salt of organic acid, more than 0.5 wt. parts of monohydroxybenzoic acid component, more than 0.5 wt. part of at least one of an alkylphenol-type resin or a cresol-formaldehyde-type resin and 100 wt. parts of a rubber.

3. The rubber composition of claim 1, wherein said cobalt salt of organic acid is a cobalt salt of organic acid having 6-30 carbon atoms.

4. The rubber composition of claim 1, wherein said monohydroxybenzoic acid component is mononydroxybenzoic acid, or an alkyl ester thereof.

5. The rubber composition of claim 1, wherein said monohydroxybenzoic acid is para-mono-hydroxybenzoic acid.

6. The rubber composition of claim 1, wherein said rubber is natural rubber, styrene-butadiene rubber, polybutadiene rubber or polyisoprene rubber.

7. The rubber composition of claim 2, wherein said alkylphenol-type resins and cresol-formaldehyde-type resins are o-cresol-formaldehyde resin, p-cresol-formaldehyde resins, t-butylphenol-formaldehyde resins, p-octylphenol-formaldehyde-resins and modified phenol resins.

8. A vulcanized rubber product reinforced with tire cords which comprises a rubber composition comprising more than 0.5 wt. part of a cobalt salt of organic acid, more than 0.5 wt. part of monohydroxybenzoic acid component per 100 wt. parts of the rubber.

9. The vulcanized rubber product of claim 8, wherein steel tire cords are used for reinforcing the rubber product.

10. The vulcanized rubber product of claim 8, wherein a copper alloy coated steel tire cords are used for reinforcing the rubber product.

* * * * *